United States Patent
Shajii et al.

(10) Patent No.: US 7,463,991 B2
(45) Date of Patent: Dec. 9, 2008

(54) MASS FLOW VERIFIER WITH FLOW RESTRICTOR

(75) Inventors: Ali Shajii, Canton, MA (US); Daniel Smith, North Andover, MA (US)

(73) Assignee: MKS Instruments, Inc., Andover, MA (US)

( * ) Notice: Subject to any disclaimer, the term of this patent is extended or adjusted under 35 U.S.C. 154(b) by 0 days.

(21) Appl. No.: 11/367,641

(22) Filed: Mar. 3, 2006

(65) Prior Publication Data

US 2006/0217900 A1 Sep. 28, 2006

Related U.S. Application Data

(63) Continuation-in-part of application No. 11/090,120, filed on Mar. 25, 2005, now Pat. No. 7,174,263.

(51) Int. Cl.
G01F 1/12 (2006.01)
G01F 1/50 (2006.01)

(52) U.S. Cl. .............. 702/100; 702/113; 702/114; 702/115; 73/1.16; 73/1.34; 73/3; 73/199; 73/861; 73/865

(58) Field of Classification Search .......... 702/100, 702/113–115; 73/1.16, 1.34, 3, 199, 861, 73/865

See application file for complete search history.

(56) References Cited

U.S. PATENT DOCUMENTS 5,684,245 A * 11/1997 Hinkle ............... 73/1.35

6,955,072 B2 * 10/2005 Zarkar et al. ............. 73/1.36
7,174,263 B2 * 2/2007 Shajii et al. ............. 702/100
2006/0005882 A1 1/2006 Tison et al.

FOREIGN PATENT DOCUMENTS

EP 0 890 828 A1 1/1999

OTHER PUBLICATIONS

MKS Instruments, Inc., Gas Box Rate of Rise In Situ Flow Verifier the BGROR Bulletin GBROR, Aug. 1999, 6 pp.
MKS Instruments, Inc. Tru-Flow Mass Flow Verifier Model GBR3A, Bulletin Tru-Flo, May 2001, 4 pp.

* cited by examiner

*Primary Examiner*—Edward Cosimano
*Assistant Examiner*—Sujoy K Kundu
(74) *Attorney, Agent, or Firm*—McDermott Will & Emery

(57) ABSTRACT

A flow verifier for verifying measurement of a flow rate of a fluid by a device includes a flow restrictor that renders the flow rate verification substantially insensitive to elements upstream of the flow restrictor. The flow verifier includes a vessel that receives a flow of the fluid from the device, and a pressure sensor that measures pressure of the fluid within the vessel. An outlet valve regulates flow of the fluid out of the vessel. The flow restrictor is located adjacent to and upstream of the vessel, along a flow path of the fluid. The flow restrictor restricts the flow of the fluid so as to induce a shock in the flow path of the fluid, and sustains the shock during a time period sufficient to render the flow rate verification substantially insensitive to the elements upstream of the flow restrictor.

9 Claims, 3 Drawing Sheets

US 7,463,991 B2

MASS FLOW VERIFIER WITH FLOW RESTRICTOR

CROSS-REFERENCE TO RELATED APPLICATIONS

This application is a continuation-in-part application of: U.S. patent application Ser. No. 11/090,120 (the "'120 application") filed on Mar. 25, 2005, now U.S Pat. No.7,174,263, entitled "External Volume Insensitive Flow Verification." The contents of this application is incorporated herein by reference in its entirety as though fully set forth.

BACKGROUND

A number of high-precision measurement systems may be useful in materials processing. These high-precision measurement systems may include, but are not limited to, mass flow controllers (MFCs) and mass flow meters (MFMs).

It may be desirable and sometimes necessary to test, or verify, the accuracy of an MFC or an MFM. One way to verify the accuracy of an MFC or MFM is through a rate-of-rise (ROR) flow verifier. A typical ROR flow verifier may include a volume, a pressure transducer, and two isolation valves, one upstream and one downstream. The valves may be closed during idle, and may open when a run is initiated, allowing flow of fluid from the MFC (or MFM) through the flow verifier. Once fluid flow has stabilized, the downstream valve may be closed, and as a result the pressure may begin to rise in the volume. The pressure transducer may measure the pressure rise. This measurement may be used to calculate the flow rate, thereby verifying the performance of the ROR flow verifier.

Sometimes, measurement errors may result from connecting volumes in the flow path between the MFC and the ROR flow verifier, such as external plumbing located upstream from the ROR flow verifier. As fluid from the MFC (or MFM) flows from the MFC along the flow path through the plumbing or other type of connecting volume, the resulting pressure drop may cause inaccuracies in the pressure measurements by the pressure transducer.

For these reasons, there is a need for a system and method that can effectively prevent plumbing or other elements located upstream of the mass flow verifier from affecting the accuracy of the flow verification process.

SUMMARY

A flow verifier for verifying measurement of a flow rate of a fluid by a device includes a vessel configured to receive a flow of the fluid from the device, and a pressure sensor configured to measure pressure of the fluid within the vessel. A flow restrictor is located adjacent to and upstream of the vessel, along a flow path of the fluid from the device through the inlet into the vessel. The flow restrictor is configured to restrict the flow of the fluid along the flow path so as to induce a shock in the flow path. The flow restrictor is further configured to sustain the shock during a time period sufficient to render the verification substantially insensitive to an element upstream of the flow restrictor.

An apparatus is described for preventing an external element from affecting verification by a mass flow verifier of measurement of flow rate by a device. The external element is upstream from the mass flow verifier. The apparatus includes a flow restrictor located adjacent to and upstream of the mass flow verifier, along a flow path of the fluid from the device into the mass flow verifier. The flow restrictor is configured to restrict the flow of the fluid along the flow path so as to induce a shock in the flow path. The flow restrictor is further configured to sustain the shock during a time period sufficient to render the verification substantially insensitive to the upstream external element.

A method of verifying measurement of a flow rate of a fluid by a device includes causing the fluid to flow from the device into a vessel along a flow path, while an outlet valve of the vessel is kept open, and allowing a flow rate of the fluid into the vessel and a pressure of the fluid within the vessel to reach a steady state. The method includes closing an outlet valve of the vessel so that pressure of the fluid begins to rise within the vessel. The method further includes restricting flow of the fluid so as to induce a shock, at a location along the flow path, adjacent to and just upstream of the vessel. The shock is induced by causing the bulk velocity of the fluid to become supersonic between an element upstream of the location and the vessel. The shock is sustained for a time period, during which the rate of rise in the pressure of the fluid within the vessel is measured, and the measured rate of rise of the pressure is used to calculate the flow rate of the fluid.

DETAILED DESCRIPTION

In the present disclosure, a mass flow verifier is described that includes a flow restrictor that effectively decouples any occurrence upstream of the flow restrictor from the flow verification process by the mass flow verifier.

Figure 1:
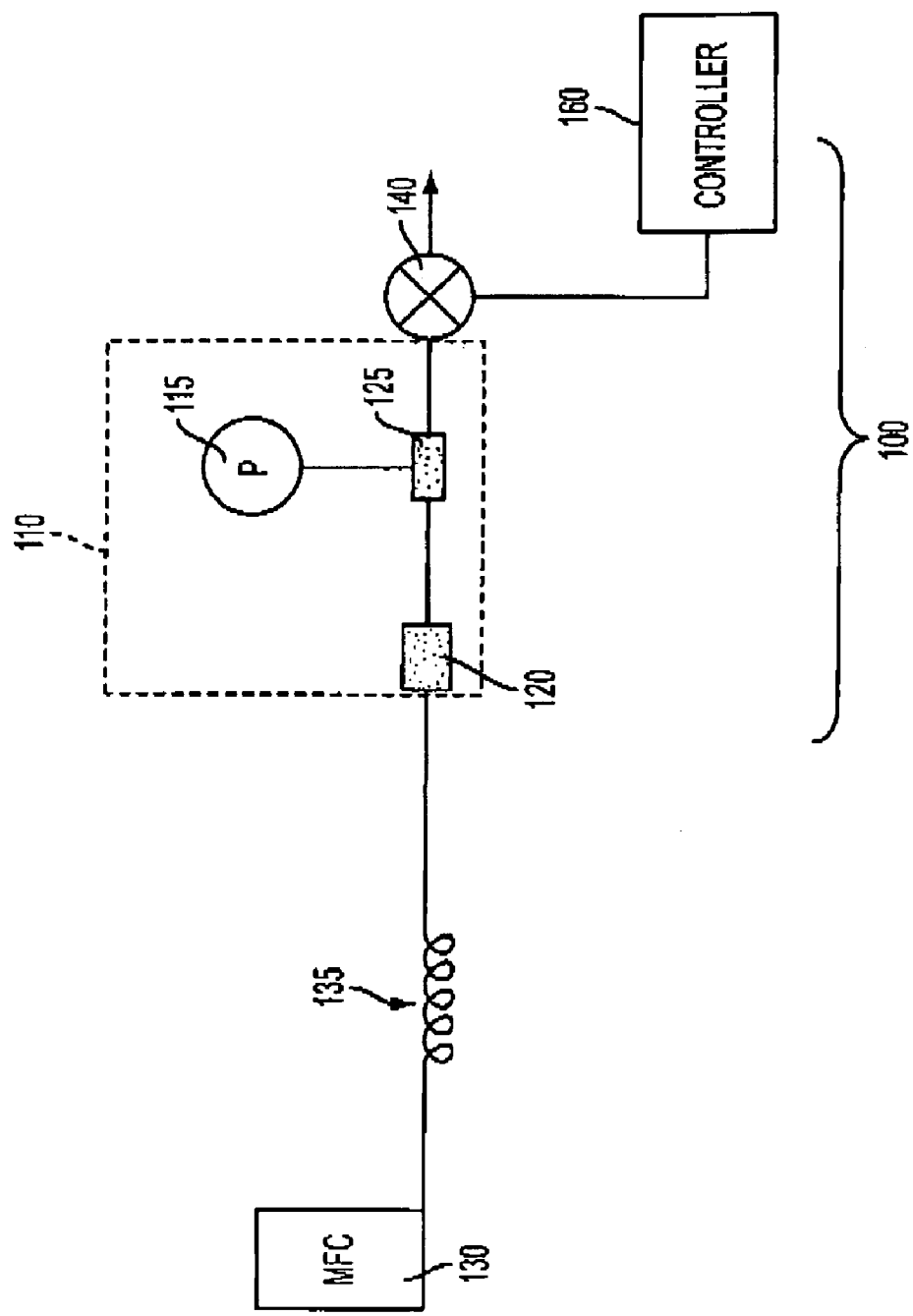
FIG. 1 is a block diagram of a gas delivery system that includes a Rate-of-Rise (ROR) mass flow verifier that has an adjustable flow restrictor, constructed in accordance with one embodiment of the present disclosure.

FIG. 1 is a block diagram of a mass flow verifier (MFV) 100 that includes a flow restrictor 120, constructed in accordance with one embodiment of the present disclosure. As described below, the flow restrictor 120 renders the mass flow verification by the MFV 100 substantially insensitive to any external volume and/or external occurrence upstream of the flow restrictor 120.

The MFV 100 includes an enclosed volume or vessel 110 that is configured to receive a flow of a fluid, from the device 130 being tested, at an inlet (not shown) of the vessel 110. The vessel 100 has a known volume V. The device 130 is typically be a mass flow controller (MFC) or a mass flow meter (MFM), which measure the flow rate of the fluid. A downstream outlet valve 140 regulates the flow of the fluid out of the vessel. An upstream inlet valve (not shown) that shuts on and off the flow of fluid from the MFC 130 into the vessel 110 may optionally be included, although in the illustrated embodiment the flow restrictor 120 itself acts as an adjustable inlet valve. The MFV 100 further includes a pressure sensor 115 configured to measure pressure of the fluid within the vessel 110, and a temperature sensor 125 configured to measure temperature of the fluid within the vessel 110.

While in the embodiment illustrated in FIG. 1, the device being tested by the MFV 100 is illustrated as being a single mass flow controller (MFC) 130, it should be noted that in other embodiments, a plurality of MFCs may be connected to and tested by the MFV 100. The plurality of MFCs may be connected to the MFV 100 via a gas manifold, for example, as illustrated and described in the "'120 application" which is incorporated by reference in its entirety, as explained in paragraph [0001] above.

A controller 160 is connected to the MFV 100. The controller 160 controls the in-situ verification of the performance of the MFC 130, and controls the operation of the inlet valve and the outlet valve. In one embodiment of the MFV 100, the controller 160 may implement a "rate-of-rise" technique flow verification technique, in which the flow rate of the fluid is determined by causing the fluid to flow into a known volume, and measuring the pressure rise that occurs during an interval of time.

In an exemplary embodiment, the MFC 130 that is being tested may be connected to the MFV 100. During idle, flow of the fluid from the MFV to the MFC 130 is shut off. When a verification run of the MFV 100 is initiated, the inlet valve and the outlet valve 140 are opened, so that fluid flows from the MFC 130 to the MFV 100. The MFC may be provided with a flow set point. During an initialization period, the fluid flow rate from the MFC 130 and the pressure of the fluid within the vessel 110 are allowed to reach a steady-state.

Once a steady-state is reached, the outlet valve 140 is closed, so that the pressure of the fluid begins to build up within the vessel 110. The controller determines the rate of rise of the pressure (i.e. the rate of change or time derivative of the pressure) during a time period, by receiving pressure measurements from the pressure sensor 115 within the vessel 110. For example, temperature and pressure measurements within the vessel 110 may be recorded at predetermined time intervals throughout the time period. In one exemplary embodiment, the predetermined time intervals may be about 0.00025 seconds each, and the total time period may range from about 0.1 seconds to about 0.3 seconds. Of course, different time intervals and total time periods may be used in other embodiments of the MFV 100. At the end of the time period, the outlet valve 140 is opened, to allow flow of the fluid out of the vessel 110 onto an exhaust (such as a vacuum pump, by way of example, or other types of exhaust or output).

The rate of rise or time derivative of the fluid pressure (divided by the fluid temperature $\Delta(P/T)/\Delta t$ may be calculated based on the measurements of temperature and pressure within the known volume of the vessel 110. Based on the calculated rate of rise $\Delta(P/T)/\Delta t$, the flow rate produced by the MFC 130 can then be determined and verified, so that the MFC 130 can be properly calibrated.

The flow rate Q is calculated by the controller 160 using:

$$Q=(VT_{STP}/P_{STP})(\Delta(P/T)/\Delta t))$$

where V is the predetermined volume of the vessel 110, $T_{STP}$ is the standard temperature (0° C. or 273.15 K), $P_{STP}$ is the standard pressure (1 atm or 101.325 kPa), and $\Delta(P/T)/\Delta t$ is the time derivative of the vessel pressure divided by the vessel temperature, obtained through the temperature and pressure measurements by the pressure sensor and the temperature sensor.

Measurement errors may result from external volumes that are located between the MFC and the MFV, such as external plumbing and other connecting elements. The external volume is typically located upstream of the MFV, on the flow path of the fluid between the MFC and MFV. An exemplary "external volume" 135 is shown in FIG. 1 between the MFC and the flow verifier 100. Examples of external volumes include, but are not limited to, external plumbings, orifices, and other volumes. When the fluid is flowing from the MFC through the external volume 135, there is a resulting pressure drop in the external volume upstream of the MFV 100. This pressure drop causes the flowing fluid to have a greater density in the upstream external volume, compared to within the volume-calibrated vessel 110 of the MFV 100. The higher density in the upstream external volume causes inaccuracies in the pressure measurement in the volume-calibrated chamber 110 of the flow verifier 100, thereby causing an error in the gas flow rate as detected by the flow verifier. A time-consuming setup calibration may be necessary to cope with large external volumes, when detailed and accurate information about the upstream plumbing and type are necessary.

To prevent the above-described inaccuracies caused by external volumes such as external plumbing, a flow restrictor 120 is placed just upstream of the vessel 110. In the illustrated embodiment, the flow restrictor 120 renders the flow rate verification by the MFV substantially insensitive to any external volumes or other occurrences upstream of the flow restrictor, by inducing a shock in the flow path of the fluid. After the outlet valve has been closed, the pressure of the fluid starts to build up within the vessel. The flow restrictor sustains the shock during a time period sufficient to carry out the verification process.

The flow restrictor may be any element that causes the bulk fluid velocity to become supersonic. The flow restrictor may include, but are not limited to, a capillary tube, a porous plug, an orifice, a nozzle, and an adjustable valve. The nozzle may be a custom-designed nozzle.

The flow restrictor may include diffusive media. The diffusive media may have a diffusion time coefficient along an axial length of the media that is substantially greater than the response time of the pressure sensor. The diffusive media may block out all information about the upstream external volume (e.g. plumbing).

In one embodiment, the flow restrictor may be an adjustable flow restrictor. In this embodiment, the restriction of the flow of the fluid may be adjusted, based on one or more factors. These factors may include, but are not limited to, the flow rate of the fluid, the molecular weight of the fluid, and the ratio of specific heats of the fluid.

The flow restrictor induces the shock by causing a bulk velocity of the fluid to become supersonic between the element upstream of the flow restrictor and the vessel. As explained below, as long as the bulk velocity of the fluid is kept supersonic during the time period, the flow rate of the fluid into the vessel remains substantially constant during the time period in which flow verification is carried out by the controller.

The time period need to take a flow verification reading, i.e. to measure the rate of rise of pressure and to compute therefrom the fluid flow rate, can be found by integrating the full compressible Navier-Stokes equations across a shock, and is given by:

$$t=(V/A_t)[(\gamma+1)/c]-(P_i/P_{STP})(VT_{STP}/QT)$$

where t is the time period;
V is the volume of the vessel;
c is speed of sound just upstream of the shock front;
$A_t$ is a cross sectional area of the flow restrictor;
$\gamma$ is a ratio of specific heats of the gas;
$P_i$ is an initial pressure within the vessel in the beginning of the time period;
$P_{STP}$ is the standard pressure;
$T_{STP}$ is the standard temperature;
Q is a volumetric flow rate of the fluid into the vessel; and
T is temperature of the fluid within the vessel.

The above formula is generally valid for any type of external volumes or flow elements, including but not limited to capillary tubes, orifices, porous plus, adjustable valves, or nozzles.

Figure 2B:
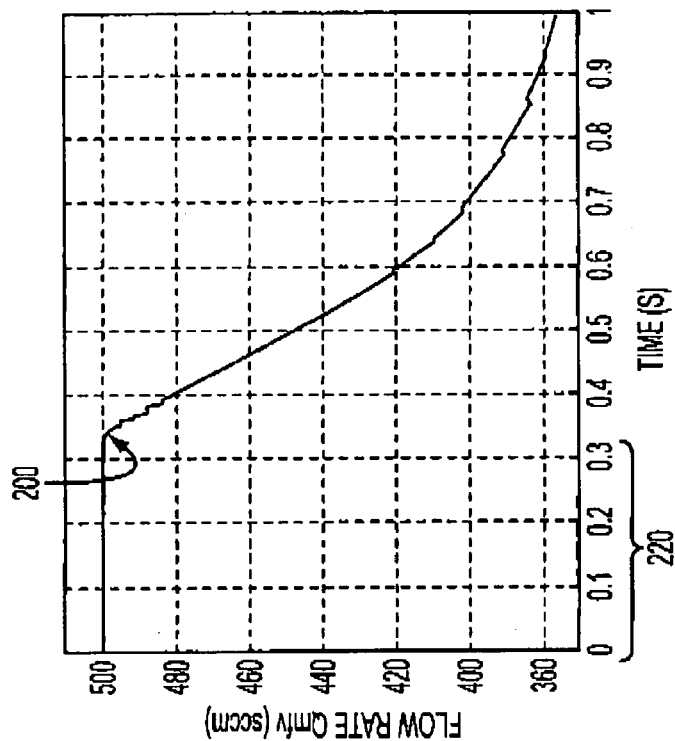
FIG. 2B illustrates a plot of the corresponding flow rate of the fluid at the Mach numbers plotted in FIG. 2A.
Figure 2A:
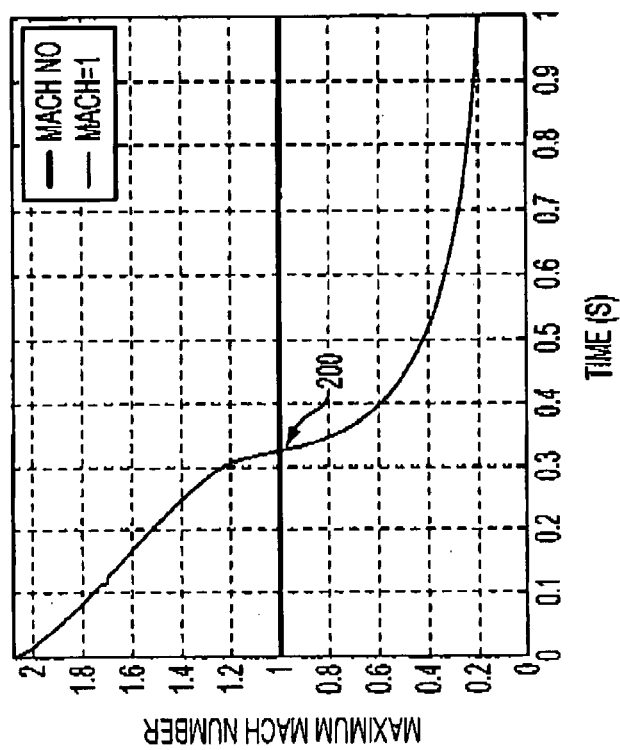
FIG. 2A illustrates a plot of the maximum Mach number of a fluid whose flow rate is being verified.

A shock occurs in the fluid flow path when the thermodynamic variables in a supersonic flow (v>c) jump, and the flow becomes subsonic across only a few mean free paths. As shown in FIGS. 2A and 2B below, as long as the flow is not subsonic between the MFV 100 and the upstream plumbing (or other external volume), the flow rate into the MFV 100 remains constant.

FIG. 2A illustrates a plot against time of the maximum Mach number of a fluid whose flow rate is being verified using the MFV 100, while FIG. 2B illustrates a plot against time of the corresponding flow rate of the fluid at the Mach numbers plotted in FIG. 2A. Both plots result from full fluid dynamic simulations. As seen from FIGS. 2A and 2B, as long as the maximum Mach number in the flow element is greater than 1, the flow rate of the fluid into the MFV 100 remains constant. When the maximum Mach number becomes less than 1, as indicated in both plots using reference numeral 200, the flow rate of the fluid into the MFV begins to drop. The amount of time available to take a flow verification reading is given by the time interval indicated in FIG. 2B with reference number 220.

Figure 3:
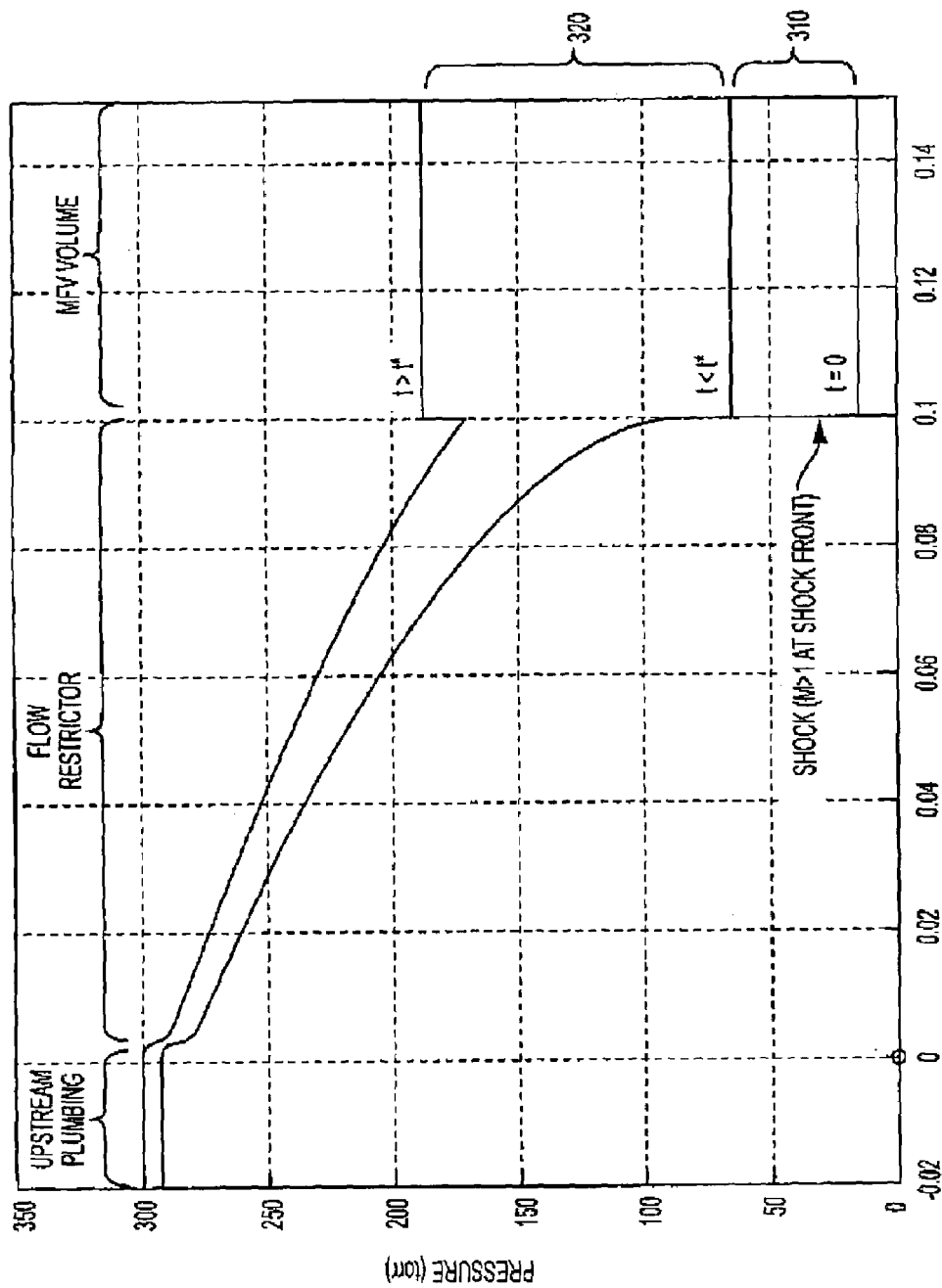
FIG. 3 shows a plot of pressure profile at different times during a verification process by the mass flow verifier illustrated in FIG. 1.

FIG. 3 is a plot of the pressure profile as a function of a space coordinate x, at different times during a calibration or verification process by the MFV illustrated in FIG. 1. The spatial coordinate x describes the spatial dimensions of the upstream external volume 135, the flow restrictor 120, and the vessel 110, respectively. A shock front, starting from which the Mach number of the fluid is greater than one, is illustrated as being located at x=0.1 m. As seen in FIG. 3, during the time interval 0<t<t*, indicated in FIG. 3 with reference numeral 310, the MFV 100 is insensitive to upstream external volumes. Therefore, the flow verification run is carried out during this time interval. As seen in FIG. 3, when t>t* (indicated in FIG. 3 with reference numeral 320), the MFV is sensitive to upstream external elements, thereby introducing inaccuracies. The use of the flow restrictor, described above, prevents such inaccuracies, when the flow verification reading is taken during the time interval 0<t<t*.

In operation, a method is used to verify fluid flow rate measurements by MFCs or MFMs. When a verification run is initiated, the fluid is caused to flow along a flow path from the MFC into a vessel of an MFV, while an outlet valve of the vessel is kept open. During an initialization period, the flow rate of the fluid flowing into the vessel, and the pressure of the fluid within the vessel, are allowed to reach a steady state. The outlet valve of the vessel is then closed, so that the pressure of the fluid begins to rise within the vessel. At a location along the flow path, adjacent to and just upstream of the vessel, a flow restrictor is used to restrict the fluid flow, so as to induce a shock. The flow restrictor induces the shock by causing a bulk velocity of the fluid to become supersonic between the upstream plumbing (or other external volume) the vessel. The flow restrictor sustains the shock during a time period sufficient to carry out the rate-of-rise flow verification process. The rate of rise in the pressure of the fluid within the vessel is measured during the time period. The measured rate of rise of the pressure is used to calculate the flow rate of the fluid.

While certain embodiments of an MFV have been described that has a flow restrictor for rendering the flow verification substantially insensitive of external volumes, it is to be understood that the concepts implicit in these embodiments may be used in other embodiments as well. The protection of this application is limited solely to the claims that now follow. In these claims, reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference, and are intended to be encompassed by the claims. Moreover, nothing disclosed herein is intended to be dedicated to the public, regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A flow verifier for verifying measurement of a flow rate of a fluid by a device, the flow verifier comprising:
    a vessel configured to receive a flow of the fluid from the device;
    an outlet valve configured to regulate flow of the fluid out of an outlet of the vessel;
    a pressure sensor configured to measure pressure of the fluid within the vessel;
    a temperature sensor configured to measure temperature of the fluid within the vessel;
    a flow restrictor located along a flow path of the fluid from the device to the vessel, the flow restrictor adjacent to and upstream of the vessel; and
    a controller configured to control the outlet valve, the controller further configured to verify the measurement of the flow rate of the fluid by the device, by measuring a rate of rise in the pressure of the fluid within the vessel during the time period after the closing of the outlet valve, and using the measured rate of rise to calculate the flow rate of the fluid from the device;
    wherein the flow restrictor is configured to restrict the flow of the fluid along the flow path so as to induce a shock in the flow path, and is further configured to sustain the shock during a time period sufficient to render the flow rate verification substantially insensitive to an element upstream of the flow restrictor;
    wherein the time period is given by:

$$t=(V/A_r)[(\gamma+1)/c]-(P_i/P_{STP})(VT_{STP}/QT)$$

where t is the time period;
    V is the volume of the vessel;
    c is speed of sound just upstream of a shock front of the shock;
    $A_r$ is a cross sectional area of the flow restrictor;
    γ is a ratio of specific heats of the gas;
    $P_i$ is an initial pressure within the vessel in the beginning of the time period;
    $P_{STP}$ is standard pressure;
    $T_{STP}$ is standard temperature;
    Q is a volumetric flow rate of the fluid into the vessel; and
    T is temperature of the fluid within the vessel.

2. The flow verifier of claim 1, wherein the device comprises at least one of:
    an MFC (mass flow controller); and
    an MFM (mass flow meter).

3. The flow verifier of claim 1, wherein the element upstream of the flow restrictor comprises at least one of:
    an external plumbing component;
    an external volume; and
    an orifice.

4. The flow verifier of claim 1,
wherein the flow restrictor is further configured to induce the shock by causing a bulk velocity of the fluid to become supersonic between the element upstream of the flow restrictor and the vessel, and to keep the bulk velocity of the fluid supersonic during the time period so that the flow rate of the fluid into the vessel remains substantially constant during the time period.

5. The flow verifier of claim 1,
wherein the flow restrictor is further configured to induce the shock in the flow path after the flow rate of the fluid into the vessel has reached a steady-state, and the outlet valve has been closed so that the pressure of the fluid begins to rise within the vessel.

6. The flow verifier of claim 1, wherein the flow restrictor comprises at least one of:
a capillary tube;
a porous plug;
an orifice;
an adjustable valve; and
a nozzle.

7. The flow verifier of claim 1, wherein the flow restrictor comprises an adjustable flow restrictor operable to adjust the restriction of the flow of the fluid based on one or more factors.

8. The flow verifier of claim 7, wherein the one or more factors comprise:
the flow rate of the fluid into the vessel;
a molecular weight of the fluid; and
a ratio of specific heats of the fluid.

9. The flow verifier of claim 1, wherein the controller is further configured to calculate the flow rate of the fluid from the device using a formula that comprises:

$$Q = (V/T)(T_{STP}/P_{STP})(\Delta P/\Delta t)$$

where V is a volume of the vessel, T is the temperature of the fluid within the vessel, $T_{STP}$ is standard temperature defined as 0° C. and about 273.15 K, $P_{STP}$ is standard pressure defined as 1 atm, and ($\Delta P/\Delta t$) is the rate of rise in the pressure of the fluid during the time interval.

* * * * *